United States Patent
Kalish et al.

(10) Patent No.: US 6,842,612 B2
(45) Date of Patent: Jan. 11, 2005

(54) METHOD OF CONNECTING NETWORK URL ADDRESSES THROUGH CELLULAR NETWORK

(75) Inventors: Dan Kalish, Rannana (IL); Yaron Kalish, Haifa (IL)

(73) Assignee: Niragongo Inc., Herzelia (IL)

( * ) Notice: Subject to any disclaimer, the term of this patent is extended or adjusted under 35 U.S.C. 154(b) by 269 days.

(21) Appl. No.: 09/741,314

(22) Filed: Dec. 20, 2000

(65) Prior Publication Data

US 2002/0077085 A1 Jun. 20, 2002

(51) Int. Cl.⁷ .............................................. H04M 11/10
(52) U.S. Cl. ................... 455/414.2; 455/422.1
(58) Field of Search ................... 455/422, 458, 455/445, 414, 422.1, 414.1, 414.2, 414.4, 564, 565; 370/401, 405, 406; 709/218, 245, 217, 238, 228; 379/207.11

(56) References Cited

U.S. PATENT DOCUMENTS

2002/0052912 A1 * 8/2001 Griswold et al. ........... 709/200
2002/0016174 A1 * 2/2002 Gibson et al. .............. 455/464

* cited by examiner

*Primary Examiner*—Lester G. Kincaid
*Assistant Examiner*—James K Moore
(74) *Attorney, Agent, or Firm*—Katten Muchin Zavis Rosenman

(57) ABSTRACT

A method and system for accessing a hyper text language based page using wireless phone apparatus dialup faculties in which the users provided with an URL dialun utility which enables the use of shortcut codes as substitutes for URL addresses. The dialup utility translates the shortcut codes according to pre-defined rules. The pre-defined rules can be implemented by using any translator program or based upon a database of URL addresses, wherein each URL has a unique code. The dialup utility can be programmed within a wireless phone apparatus or alternatively processed at remote network locations using an exchange phone system or Internet servers.

9 Claims, 5 Drawing Sheets

US 6,842,612 B2

METHOD OF CONNECTING NETWORK URL ADDRESSES THROUGH CELLULAR NETWORK

BACKGROUND OF THE INVENTION

The present invention relates to wireless networks navigating practices. More specifically, the invention relates to methodologies and utilities for accessing specific URL locations on the network.

One of the difficulties that users of the Internet have encountered is the difficulty in locating and identifying resources within the Internet. In order to help standardize the location and identification information of Internet resources, the notion of a uniform resource locator (URL) has been developed. A URL is a string that describes the location of a resource on the Internet. A URL may include a number of different components, including the identification of a scheme (i.e., Internet protocol) and a path name. A URL may be utilized by an Internet protocol handler for locating the resource that is identified by the URL.

Navigation tools have been developed to assist users in navigating the Internet. These navigation tools include Web browsers that are used to browse the World Wide Web portion of the Internet. The Web browsers have provided a number of mechanisms for assisting a user in quickly locating documents on the Internet. One mechanism, is a text box in which a user may enter a URL. After the user enters the URL, the corresponding document is retrieved and displayed.

Another mechanism that has been employed in Web browsers is a list, such as a hot list or a history list. A hot list contains a list of the user's favorite document sites. In this regard, the hot list acts as a sort of index of documents from the Internet. To view a particular document on the hot list, the user selects the item from the hot list and requests that the item be opened by double clicking on the item or using another opening mechanism. History lists are similar to hot lists, but maintain a historical list of Web sites that have been visited by a user.

Web browsers also utilize bookmarks. A bookmark is a pointer to an Internet site.

Most importantly, there is a great need to provide Web users with a system for accessing such Web pages in an easy to use, automatic, and efficient manner.

The utilities described above are convenient when conventionally surfing the web, using PC device, the user can navigate easily from one web page to another using the browser navigation utilities, in contrast, when surfing through wireless networks using micro-browsers on constrained devices, e.g. wireless phones, using these utilities is not convenient as result of the Wireless phones small size which limits the keyboard panel capabilities. For example, in case the user desires to access YAHOO web-site, the following process occurs:

The user selects browner operation to connect the internet;

User selects "inserting URL" option;

The user enters the URL address; as there is no full keyboard of all alphabet letters, the user needs to click as many as three times on a key for typing one letter The micro browser receives URL and sends request for downloading the web-site page;

In case the user already inserted the URL to his bookmarks the process is more simple (although the procedure of updating the bookmarks is in many cases same as described above):

User selects browser operation to connect to the internet;

User selects bookmark option;

User selects the desired web-site out of the bookmark list

Micro browser receives URL and sends request for downloading the web-site page;

Furthermore, the diversity of devices and of user interfaces of micro browsers (menus buttons etc.) creates a situation where the user is highly dependent on the utilities supplied by each of the cellular phone manufacturers and/or ASP service company.

As a result of these navigation constraints, users are generally provided with a time consuming and complicated accessing process.

It is thus the prime object of the invention to provide a method and system for efficient Internet access utility using wireless phone devices and various other constrained devices while maintaining their small panel structure.

SUMMARY OF THE INVENTION

A method for accessing an hyper text language based page ("network page") using wireless phone apparatus dialup faculties, said method comprising the steps of; dialing code number comprising a prefix code number and URL code number; translating URL code to URL address according pre-defined rules; and Receiving respective network page in relation to the URL address by cellular micro browser.

BRIEF DESCRIPTION OF THE DRAWINGS

These and further features and advantages of the invention will become more clearly understood in light of the ensuing description of a few preferred embodiments thereof, given by way of example only, with reference to the accompanying drawings, wherein.

DETAILED DESCRIPTION OF THE PREFERRED EMBODIMENTS

Figure 1:
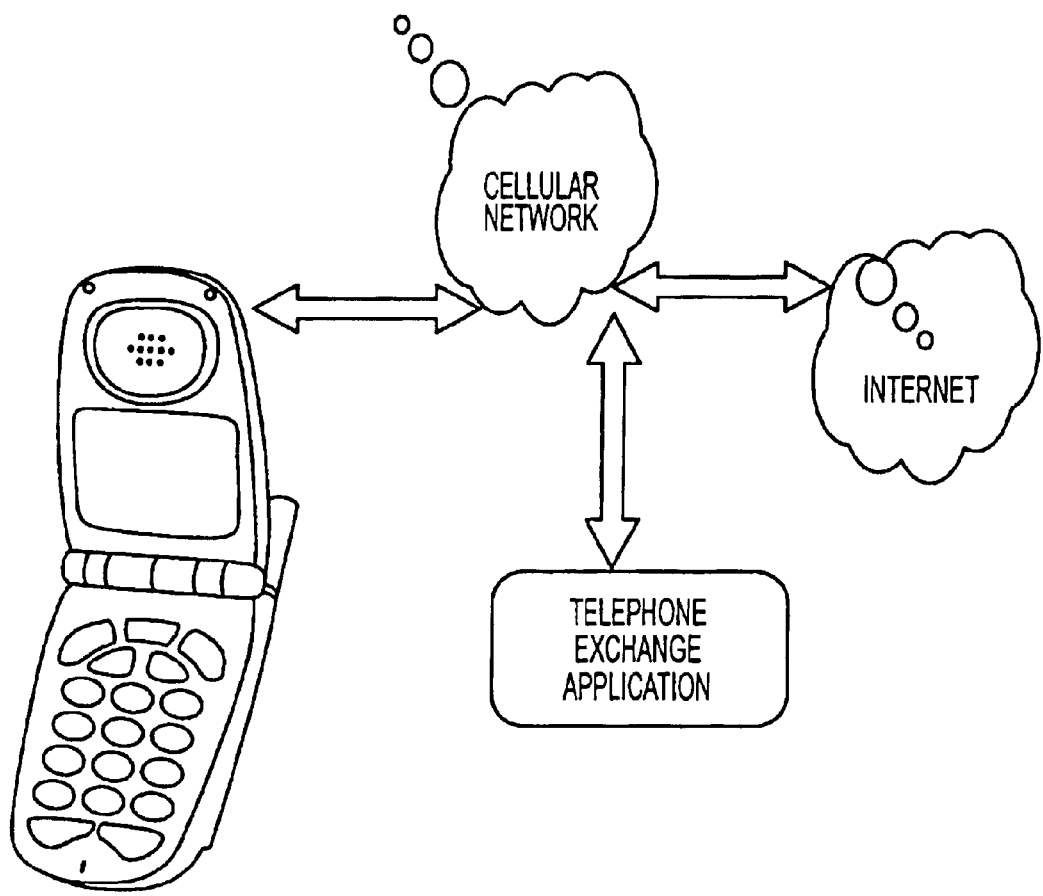
FIG. 1 is a general diagrammatic representation of the environment in which the present invention is practiced.

FIG. 1 illustrates one possible network configuration, in which the present invention can be implemented.

Referring to FIG. 1 of the drawings, it will be seen that a user is connected through cellular network to Internet network, and optionally to an automatic telephone system.

For purposes of this disclosure, by the term "automatic telephone system" is meant an exchange telephone system designated to receive telephone calls and perform automatic procedures in relation to received phone calls According to the basic concept of the present invention, the user is provided with an URL Dialup utility enabling to use shortcut codes as substitute for URL address. The dialup utility translates the shortcut codes according to pre-defined rules. The pre-defined rules can Implemented by using any translator program or based upon a database of URL addresses wherein each URL has a unique code (URL code). For example an automatic translating program can be represented by a formula translating the site name to numbers according to numeric ASCII value of each character of the site name. This dialup utility is associated as part of the dialup facilities of a cellular telephone device.

According to prior art method, when connecting the Internet by cellular phone, the user has to activate a specific application such as a micro browser. According to the present invention, the user can connect the internet using the URL dialup utility by dialing specific code numbers in the same manner he dials any conventional phone number. Each of the URL codes comprises a prefix code for indicating that this code is not a regular phone number but an URL code.

Figure 2:
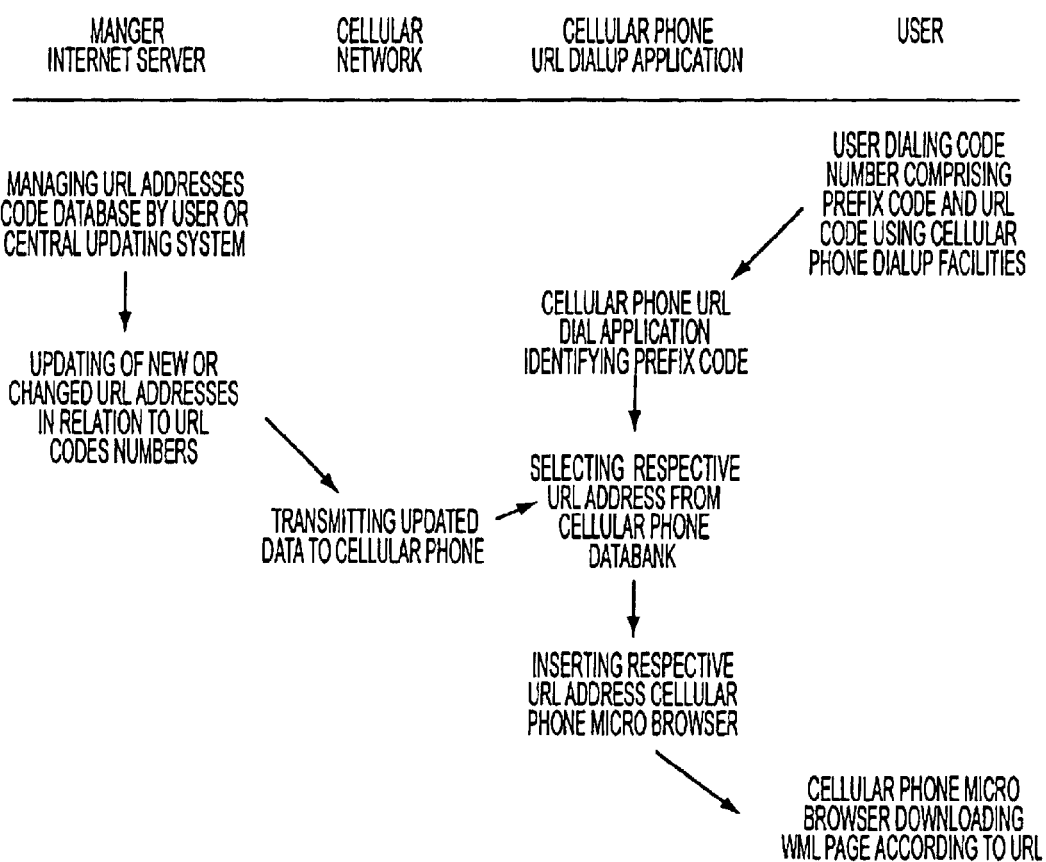
FIG. 2 is a flow-chart of accessing URL location process according to first option of the present invention.

Such dialup utility can be implemented in various ways FIG. 2 illustrates the first embodiment of the present invention for accomplishing such utility. According to this embodiment the URL database or the URL translator program are located at the cellular phone device memory unit. Further more the cellular phone is provided with an URL application.

Once the user clicks an URL code, the URL application identifies the code according to predefined prefix code and translates the URL code to the respective URL address. The micro browser of the cellular device is activated using the translated URL address.

According to further embodiment of the present invention the user is provided with an Internet service enabling the user to manage and control an URL database on the web (see FIG. 2,—Manager sever). The database can be updated using any conventional Internet terminal. After updating the database the user can push the updated data or translating program to his cellular phone. Using such service provides the user math convenient way to update and add URL codes.

Figure 3:
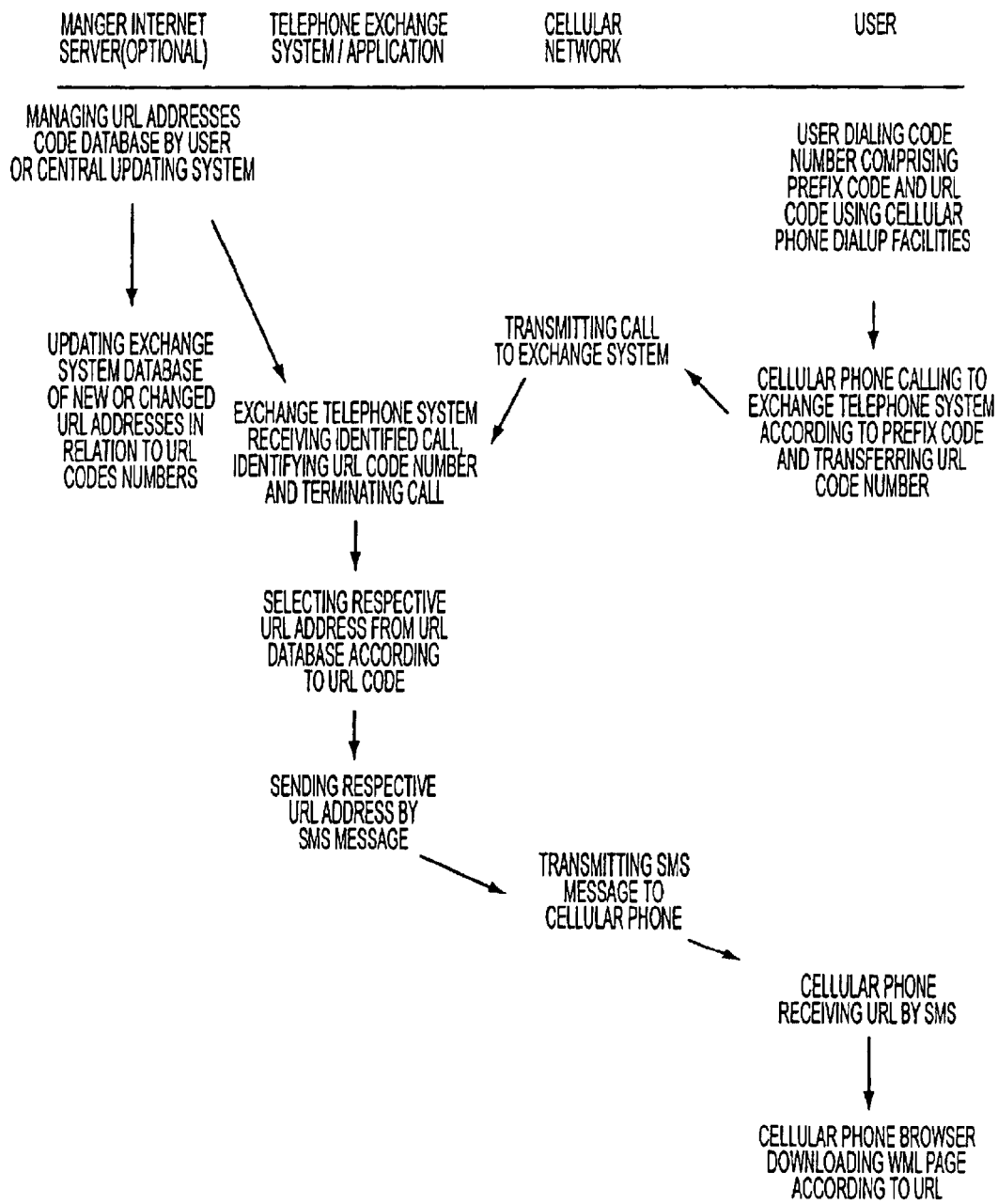
FIG. 3 is a flow-chart of accessing URL location process according to second option of the present invention.

FIG. 3 illustrates the second embodiment of the present invention for accomplishing dialup utility. According to this option the URL database or URL translator program are located at a designated automatic telephone system ("exchange telephone system"). To access a certain URL address, the user dials an URL code using any conventional cellular phone, such code comprises prefix number causing the cellular network to direct the call to the exchange telephone system.

First, the call is received by the exchange system, the system identifies the calling number and the URL code attached to the calling number. The respective "real" URL address is translated from the URL code and transmitted to the user cellular phone using any conventional push technologies such as SMS message. Upon receiving such message the micro browser is activated using the selected URL.

Figure 4:
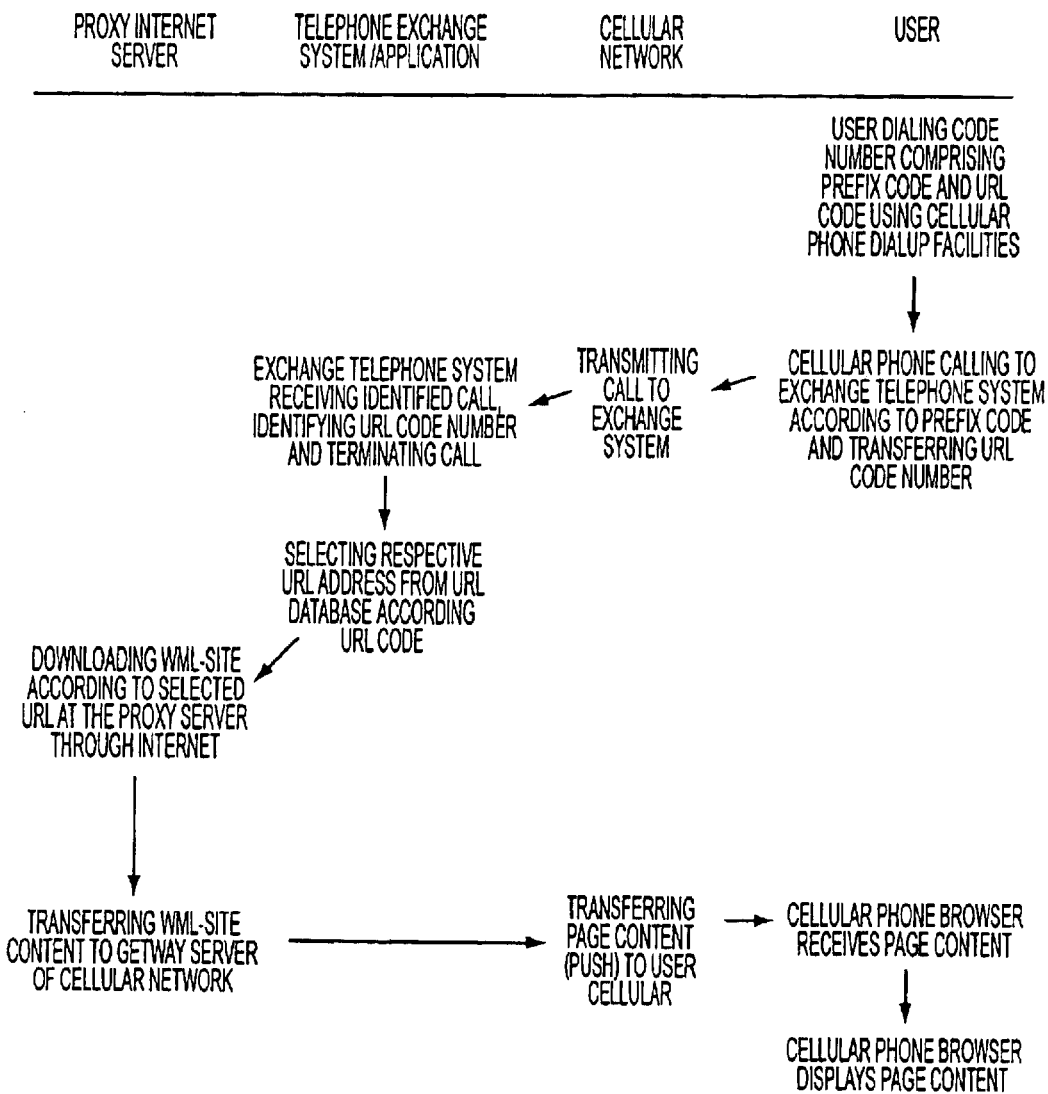
FIG. 4 is a flow-chart of accessing URL location process according to third option of the present invention.

FIG. 4 illustrates a third embodiment of the present invention for accomplishing dialup utility. This options first process steps are similar to the second option, the URL database or URL translator program is located at an exchange telephone system. The URL code is transmitted form the user cellular device through regular cellular phone call as described above. Once the exchange telephone system translates the URL code to the respective URL address, a designated server ("proxy server") downloads the relevant web-page. The content of the web-page is transferred to the user cellular phone micro browser. According to this option the micro browser is not operated in the conventional way, the process of downloading the desired web-page is not processed by the browser application but at a designated proxy-server. According to additional embodiment of the present invention, the web page content can be transferred via designated severs of the cellular telephone carriers. Such servers, which are known as "gateway server", are located and designed to intermediate between cellular phone user of any geographical zone and Internet servers. Routing the information to users via respective gateway servers is more efficient and less time consuming.

According to further embodiment of the present invention it is proposed to provide the cellular user with direct access to favorite web-page or alternatively to personalized web-page. When using the method of accessing web-page by dialing code numbers as described above the exchange telephone system is conventionally provided with phone number of the calling user. Personal information of user identification, supplied by the users themselves or by the cellular carriers can be used for directing the users to their favorite web-site (bookmarks). The users can define personal code numbers relating their favorite web-site, such operation can be done using conventional internet terminal. Upon receiving designated call form a given user the exchange telephone system matches the URL code with user identification and direct the user to their favorite web-site according to pre-defined codes. Alternatively, in case the user has a personalize web-page relating specific organization enterprise or any portal such as Yahoo ("customizing web-sites"), the user will be transferred directly to said personalized web page. Furthermore the user can be provided with designated utilities to prepare a personal map defining a group of personal favorite web-pages. As a result, upon accessing his personal page the user is directed to each of the group web-site according to pre-defined order.

When using either option 2 or 3 as described above cellular phone devices and its software application, need not to be changed or updated to enable users to use the dialup service as described above.

Figure 5:
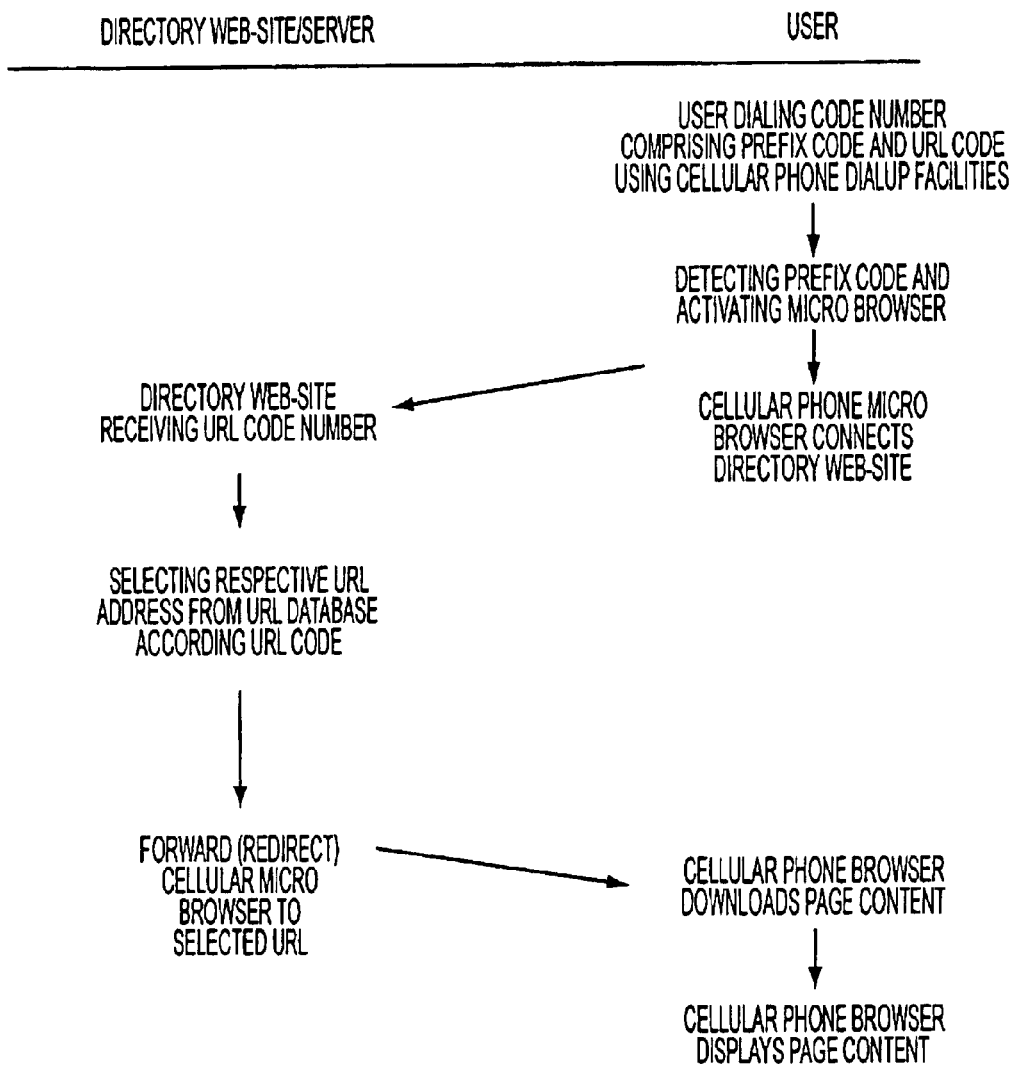
FIG. 5 is a flow-chart of accessing URL location process according to forth option of the present invention.

FIG. 5 illustrates the forth embodiment of accomplishing dialup utility. According to this option the URL database or the URL translator are located at a designated Internet server ("The directory server"). To access a certain URL address, the user dialup an URL code, such code comprises prefix number which activates the micro browser of the cellular device to connect a designated web-site ("directory web site") located at the directory server. For implementing such procedure the telephone must be provided with designated application enabling to detect the specific prefix code prior to dialup operation and activate the micro browser upon identifying the respective prefix.

Once connecting to the directory web-site, the URL code is translated to URL address. As a result the micro browser is automatically transferred to the URL location according to the said URL address.

Dialup utility as described above provides the user with convenient procedure, for connecting the Internet. The user enjoys all dialup capabilities of conventional cellular phone such as telephone databank, speed dialup, voice activate dialup etc.

It should be appreciated that the above-described embodiments are directed at a cellular communication environment. However, the invention in its broad aspect is equally applicable to computerized network communication in general, such as satellite, blue-tooth, and others.

While the above description contains many specificities, these should not be construed as limitations on the scope of the invention, but rather as exemplifications of the preferred embodiments. Those skilled in the art will envision other possible variations that are within its scope. Accordingly, the scope of the invention should be determined not by the embodiments illustrated, but by the appended claims and their legal equivalents.

What is claimed is:

1. A method for accessing a hyper text language based page ("network page") using apparatus dialup facilities of a wireless phone device, said method comprising the steps of:
   dialing a code number comprising a prefix code number and a URL code number;
   calling an exchange phone system according to the prefix code number;
   receiving a call by the exchange phone system identifying phone call sources and detecting URL code;
   translating said URL code in the exchange phone system which contains a translation program, said URL code being translated to a URL address according to pre-defined rules;
   pushing the translated URL address from the exchange phone system to the wireless phone device;
   requesting a respective network page by a cellular micro browser of the wireless phone device; and
   receiving the respective network page in relation to the URL address by the cellular micro browser.

2. The method of claim 1, further comprising the steps of:
   identifying a user according to a cellular phone number of the user by the exchange telephone system; and
   translating the URL code according to definitions for the identified user.

3. The method of claim 1, wherein a user has a defined personal network page relating to a web-site located at the translated URL address ("customization web site"), said method further comprising the steps of:
   identifying the user according to a cellular phone number of the user by the exchange telephone system;
   transferring the user directly to the defined personal network page relating to the customization web site.

4. The method of claim 1, wherein the URL code number and the respective translation can be defined by a user, said method further comprising the steps of:
   identifying the user according to a cellular phone number of the user by the exchange phone system; and
   translating the URL code according to definitions for the identified user.

5. The method of claim 1, wherein a user has defined a personal network page relating to a web-site located at the translated URL address ("customization web-site"), said method further comprising the steps of:
   Identifying the user according to a cellular phone number of the user by the exchange phone system; and
   transferring the user directly to the personal network page relating to the customization web site.

6. A system of accessing a hyper text language based page ("network page") using dialup facilities of a wireless phone device, said system comprising:
   detecting means located at an exchange phone system for identifying a code number comprising a prefix code number and a URL code number;
   translating means located at the exchange phone system for translating the URL code number to a URL address;
   communication means for connecting to the exchange phone system according to the prefix code number, and for receiving the URL code number by the exchange telephone system;
   pushing means for transferring the translated URL address from the exchange phone system to the wireless phone device; and
   browsing means for requesting a respective network page by the wireless phone device according to the translated URL.

7. The system of claim 6, wherein the translating means are located at the exchange telephone system, said translating means further comprising:
   browsing means for downloading the respective network page by the exchange system; and
   pushing means for transferring the respective network page from the exchange phone system to the wireless phone device.

8. The system of claim 6, wherein the URL code number and the respective translation can be defined by a user, said system further comprising:
   detecting means for identifying the user according to a cellular phone number of the user by the exchange phone system, said translating means using said user identification for translating the URL address according to user definitions.

9. The system of claim 6, wherein a user has defined a personal network page relating to a web-site located at the translated URL address ("customization web-site"), said system further comprising:
   detecting means for identifying the user according to a cellular phone number of the user by the exchange phone system; and
   transferring means for redirecting the user to the personal network page relating to the customization web site.

* * * * *